US009183654B2

United States Patent
Geggie et al.

(10) Patent No.: US 9,183,654 B2
(45) Date of Patent: Nov. 10, 2015

(54) LIVE EDITING AND INTEGRATED CONTROL OF IMAGE-BASED LIGHTING OF 3D MODELS

(76) Inventors: Sean Geggie, Aarhus (DK); Jeffrey McCartney, Irvine, CA (US); Thomas Teger, Orange, CA (US); Claus Wann Jensen, Silkeborg (DK); Hennk Wann Jensen, Solana Beach, CA (US)

(*) Notice: Subject to any disclaimer, the term of this patent is extended or adjusted under 35 U.S.C. 154(b) by 538 days.

(21) Appl. No.: 13/561,727

(22) Filed: Jul. 30, 2012

(65) Prior Publication Data

US 2013/0229413 A1 Sep. 5, 2013

Related U.S. Application Data

(60) Provisional application No. 61/606,297, filed on Mar. 2, 2012.

(51) Int. Cl.
    *G06T 11/60* (2006.01)
    *G06T 15/50* (2011.01)

(52) U.S. Cl.
    CPC .............. *G06T 11/60* (2013.01); *G06T 15/506* (2013.01)

(58) Field of Classification Search
    None
    See application file for complete search history.

(56) References Cited

U.S. PATENT DOCUMENTS

| | | | |
|---|---|---|---|
| 6,983,082 B2 * | 1/2006 | Duiker | 382/284 |
| 2004/0095357 A1 * | 5/2004 | Oh et al. | 345/589 |
| 2005/0012757 A1 * | 1/2005 | Park et al. | 345/582 |
| 2005/0017971 A1 * | 1/2005 | Ard | 345/423 |
| 2005/0081161 A1 * | 4/2005 | MacInnes et al. | 715/765 |
| 2007/0035707 A1 * | 2/2007 | Margulis | 353/122 |
| 2008/0131010 A1 * | 6/2008 | Wilensky | 382/238 |
| 2011/0080570 A1 * | 4/2011 | Sunohara | 355/53 |
| 2012/0120054 A1 * | 5/2012 | Sandrew et al. | 345/419 |

\* cited by examiner

*Primary Examiner* — Maurice L McDowell, Jr.

(57) ABSTRACT

The present invention relates to a system, method, and apparatus that include a novel connection between a 3D raytracing application and an editing application to allow live editing of an image representing the lighting of a 3D model. Further embodiments include a novel pin control in the editing application that allows pin control of lighting of a specific portion of the lighting image and 3D model to adjust the intensity, color, and blur of the environment within a given region. The pins can also be used to copy regions of data from the lighting image to new locations. The pins can be placed either directly by clicking in the lighting image or by clicking on the 3D model in the raytracing application to indicate where the illumination should fall or reflect.

20 Claims, 4 Drawing Sheets

LIVE EDITING AND INTEGRATED CONTROL OF IMAGE-BASED LIGHTING OF 3D MODELS

CROSS REFERENCE TO RELATED APPLICATIONS

This application claims priority under 35 U.S.C. §119(e) to U.S. Provisional Application No. 61/606,297, filed Mar. 2, 2012, and entitled "Live editing and integrated control of image-based lighting of 3D models," the disclosure of which is hereby incorporated by reference in its entirety.

BACKGROUND OF THE INVENTION

1. Field of Invention

The present invention relates generally to a three-dimensional (3D) model having image-based lighting in a computer rendering environment and specifically to a method, apparatus, and system for live editing and local control of the 3D model.

2. Description of Related Art

Computer rendering is a process used to generate images of 3D models. The goal is often an image of the digital model that looks like a photograph of the real object in the real world. This particular instance of rendering is called photorealistic rendering. Other instances of rendering include stylistic rendering for illustration purposes.

Computer generated imagery of 3D models include a description of both the materials and lighting of the 3D model. The description of the materials include how the light reflects in different directions as it strikes a specific part of the 3D model. The description of the lighting can be given as light sources emitting the lighting onto the 3D model. A specific type of light source is image-based lighting.

Image-based lighting is a 3D rendering technique which involves capturing an omni-directional representation of real-world light information as an image, typically using a specialized camera. This image is then projected onto a dome or sphere analogously to environment mapping, and for this is used to simulate the lighting for the objects in the scene. This allows highly detailed real-world lighting to be used to light a scene, instead of trying to accurately model illumination using an existing rendering technique. Image-based lighting often uses high dynamic range imaging for greater realism, though this is not universal. Almost all modern rendering software offers some type of image-based lighting, though the exact terminology used in the system may vary. Image-based lighting is also starting to show up in video games as video game consoles and personal computers are starting to have the computational resources to render scenes in real time using this technique.

Image-based lighting includes an image that represents the lighting of the 3D model. This image that is used to represent the lighting can be used to represent a distant lighting environment such as a distant sphere, and each pixel in the image corresponds to a specific location on this distant sphere. The values of the pixels in the image correspond directly to the intensity of the lighting from that location.

Lighting in the real world can have intensities spanning multiple orders of magnitude. As such, the image used to represent the lighting will typically be a high dynamic range image where each pixel can represent more than the traditional 256 intensities. For example, the image used to represent the lighting can have each pixel being represented by a 32 bit floating point number. The 32 bit floating number makes it possible to represent more than 37 orders of magnitude of lighting intensities.

A problem with existing image-based lighting is that it is difficult to setup, modify or adjust the lighting to achieve a desired illumination of the 3D model. While conventional tools exist for creating image based lighting, there is no existing solution that offers a direct integration of a 3D rendering system with an image based lighting system where the lighting information can be transferred from the 3D rendering system to the editor and back. Existing systems only allow for transferring images to the rendering application and not from the rendering system. The ability to transfer lighting from the rendering application to the editor is critical to allow for small adjustments and fine-tuning of the lighting rather than starting from scratch. Being able to transfer both to and from the 3D rendering system would make the editor an integrated component of the rendering application with a natural and fast method for adjusting the image based lighting environment. Of critical importance is the ability to interactively view a 3D model illuminated by the image based lighting environment as it is being edited.

U.S. Pat. No. 6,983,082 to Duiker is directed to a reality-based light environment for digital imaging in motion pictures. Duiker uses image-based lighting in the rendering of digital objects derived from image data collected from a real motion-picture set. The image data includes sets of correlated images at different exposure levels, each corresponding to a selected location. The image data is processed to define an extended dynamic range panoramic image for each selected set location. The image data is color and intensity corrected based on a scaled reference object. Although Duiker's system includes image-based lighting, Duiker's system does not integrate with an editor or adjust local portions of a 3D model.

SUMMARY OF THE INVENTION

Embodiments of the present invention relate to a system, method, and apparatus that include a novel connection between a 3D raytracing application and an editing application to allow live editing of an image representing the lighting of a 3D model. Further embodiments include a novel pin control in the editing application that allows pin control of a specific portion of the lighting image and 3D model to adjust the intensity, color, and blur of the environment within a given region.

In one embodiment of the invention, a system comprises: a raytracing application configured to display a three-dimensional model illuminated by an image having image-based lighting; an editing application configured to edit the image, wherein the editing application comprises pin control, wherein the pin control comprises one or more pins configured to adjust less than the entire image; and a connection configured to connect the raytracing application to the editing application, wherein the connection is configured to transfer the image from the raytracing application to the editing application. The editing application may place one or more pins, wherein the pins identify a region of the image where a color is added, multiplied, or blurred. The blur can be anisotropic to represent a specific direction of the blur. The editing application may place one or more pins that identify a region where a hue, a contrast, or a brightness is changed in the image. The pin may identify a region of the image that can be copied and moved to another location in the image. The one or more pins may be moved around in the image after being placed. The one or more pins may be toggled on and off to evaluate the lighting of the 3D model. A hue change, a contrast enhancement, or a brightness change may be applied to the entire image. The location of the one or more pins may be computed based on a clicked location on the three-dimensional model.

In another embodiment of the invention, the method comprises the steps of: displaying a three-dimensional model illuminated by an image having image-based lighting; editing the image, wherein the editing comprises pin control, wherein the pin control comprises one or more pins configured to adjust less than the entire image; and connecting a raytracing application to an editing application, wherein the connection is configured to transfer the image from the raytracing application to the editing application.

An advantage of the present invention is that the system has a connection that makes it possible to transfer this image directly to an editing application, where the editing application can make changes to the image representing the lighting. This allows integrated live editing of image based lighting. The changes from the editing application are updated on a raytracing application on the fly (e.g., interactively) such that the effect of the changes to the image can immediately be seen as changes in the lighting of the 3D model. A further advantage is that pin control makes it easy to locally adjust the intensity, color, and blur of the lighting image. The pins also make it possible to copy specific regions of the lighting image to other locations (copy and paste). The pins can be used to remove features in the lighting image. Of particular importance is the ability to mark points or areas on the 3D model that should receive lighting and transfer this information from the rendering application into the editing application such that the lighting image shows where lighting should be placed in order to illuminate the specified areas of the 3D model.

The foregoing, and other features and advantages of the invention, will be apparent from the following, more particular description of the preferred embodiments of the invention, the accompanying drawings, and the claims.

DETAILED DESCRIPTION OF THE INVENTION

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

The present invention relates to a novel method, system, and apparatus for editing and controlling image-based lighting within an interactive 3D raytracing environment. Image-based lighting captures a representation of real-world light information as an image, and then projects this image to simulate the lighting for the objects in a scene. The system enables a 3D raytracing application to transfer an image directly to an editing application. The editing application can make changes to the image representing the lighting and these changes automatically update the image in the 3D raytracing application such that such that the edited changes to the image can be seen as changes in the lighting of the 3D model. The editing application further uses a novel pin control that makes it easy to control lighting specific portions of the 3D model. The pin control makes it possible to locally adjust the intensity, color, and blur of the 3D raytracing environment within a given region. Although the invention is sometimes illustrated and described in the context of 3D rendering, one of ordinary skill in the art can apply these concepts in other dimensions (e.g., 2D, 4D, etc.).

Figure 1:
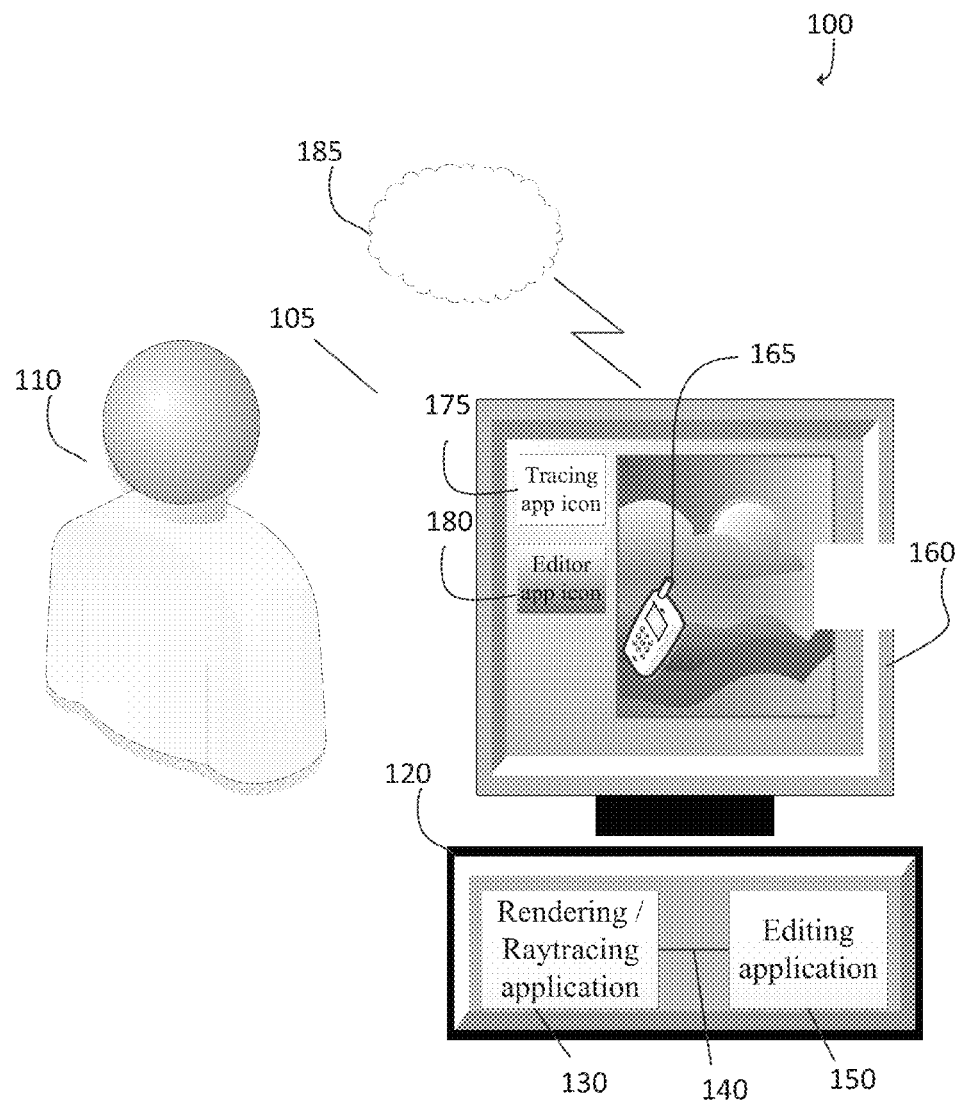
FIG. 1 illustrates a 3D rendering system for live editing and local control of a 3D model having image-based lighting according to one embodiment of the invention.

FIG. 1 illustrates a 3D animation system 100 for live editing and local control of a 3D model having image-based lighting according to one embodiment of the invention. The system 100 includes a terminal 105, a user 110, terminal hardware 120 having a raytracing/rendering application 130 integrated with an editing application 150 through a connection 140, a terminal screen 160 having a 3D model 165, a raytracing application icon 175 and an editing application icon 180, and the system 100 having a network 185. The system 100 provides on the fly editing of an image representing lighting and makes it easy to locally control and adjust the lighting.

The terminal 105 comprises the terminal hardware 120 and the terminal screen 160. The user 110 can create, edit, watch, listen, or interact with the 3D model 165 on the terminal screen 160. The terminal hardware 120 comprises a processor, memory, the raytracing application 130, and the editing application 150. The processor can be used to create and edit the 3D model 165, and the memory can be used to store the 3D model 165. Although the terminal hardware 120 is illustrated as a computer, it could instead be another electronic display device (e.g., a smartphone, a television, a MP3 player, etc.).

The raytracing/rendering application 130 includes an interactive 3D raytracing environment. In general, in computer graphics, raytracing is a technique for generating an image by tracing the path of light through pixels in an image plane and simulating the effects of its encounters with virtual objects. The technique is capable of producing a very high degree of visual realism, usually higher than that of typical scanline rendering methods, but at a greater computational cost. This makes raytracing best suited for applications where the image can be rendered slowly ahead of time, such as in still images and film and television special effects, and more poorly suited for real-time applications like video games where speed is critical. Raytracing is capable of simulating a wide variety of optical effects, such as reflection and refraction, scattering, and dispersion phenomena (such as chromatic aberration).

The raytracing application 130 (e.g., 3D rendering system, rendering application, etc.) allows a ray traced view of the 3D model 165. The raytracing application 130 shows the 3D model's encounters with virtual objects. Raytracing is capable of simulating a wide variety of optical effects, such as reflection and refraction, scattering, and dispersion phenomena (such as chromatic aberration). The raytracing application 130 includes an image representing the lighting of the 3D model 165. The raytracing application 130 shows live (e.g., interactively) the effect of a fully ray traced 3D model illuminated by lighting given by the image. The rendering application 130 can be a full raytracing application capable of computing reflections, refractions, shadows, and global illumination.

The connection 140 makes it possible to transfer the image representing the lighting directly to the editing application 150. The connection 140 allow for the raytracing application 130 to interact directly with the editing application 150. The connection 140 transfers the lighting represented by the image to and from both the raytracing application 130 and the editing application 150 to enable lighting changes.

The connection 140 between the ray tracing and the editing application can be realized with a plugin utilizing a specific application programmer interface (API) that enables both the direct transfer of edited lighting images to the ray tracing application as well as direct transfer of desired pin locations to the editor to reflect user actions in the ray traced output image.

The connection 140 provides a novel bidirectional way of transferring images from the rendering application 130 to the lighting editor 150 and back. This makes the lighting editor 150 seem like a natural extension of the rendering application 130. The rendering application 130 shows the illuminated 3D model 165. The user 110 can edit the image based lighting. The editor 150 opens with the current lighting environment and allows for editing operations. The effects of these operations are updated interactively in the rendering application 130, and it directly shows the 3D model 165 under the new edited lighting conditions. The user 110 can close the editor 150, and later start it again, and continue editing the result of the last editing operations. The image can be transferred to the editing application 150 both in memory for fast operation or over a network (wired or wireless).

The editing application 150 (e.g., editor, lighting editor, etc.) displays the image representing the lighting. The editing application 150 allows editing of the image representing the lighting of the 3D model 165. These edits update the raytracing application 130 in real-time such that the effect of the changes to the image can be seen as changes in the lighting of the 3D model in the raytracing application 130. These lighting changes are applied dynamically and interactively onto the 3D model as edits are performed on the lighting image. The editing application 150 also uses a novel pin control discussed further with respect to FIG. 2.

The terminal screen 160 displays the raytracing application 130 and the editing application 150. The terminal screen 160 can be a computer screen. The 3D model 165 (e.g., 3D animation, scene, etc.) can be a previously created 3D model made by another user on another terminal or the 3D model 165 can be made from scratch by the user 110 on the terminal 105. The 3D model 165 can be imported into the terminal hardware 120 from other computer-aided design (CAD) systems. Some CAD systems include SolidWorks, Autodesk Inventor, and PTC-Creo.

The 3D model 165 can be one or more objects. The objects (e.g., 3D object, elements, geometric object, etc.) can be moved over any given start and end time. The illustrated 3D model 165 is a smartphone. However, the 3D model 165 could be many other things, such as cars, consumer products, merchandise, persons, or buildings, as long as it is represented in 3D geometry or polygons.

The raytracing application icon 175 and the editing application icon 180 are illustrated on the terminal screen 160. The raytracing application icon 175 and the editing application icon 180 correspond to the raytracing application 130 and the editing application 150, respectively. In this embodiment, the editing application 150 is open displaying the 3D model 165 which can be edited.

The network 185 (e.g., the Internet, a distribution platform, etc.) provides a way to connect to and from the terminal 105. For example, the network 185 can provide 3D models to the terminal 105. Alternatively, 3D models can be created on the terminal 105 itself. Also, the network 185 can connect the terminal 105 with any other terminals, such that 3D models 165, objects, and animation components can be distributed between the user 110 and other users. The network 185 can further comprise a series of servers.

Figure 2:
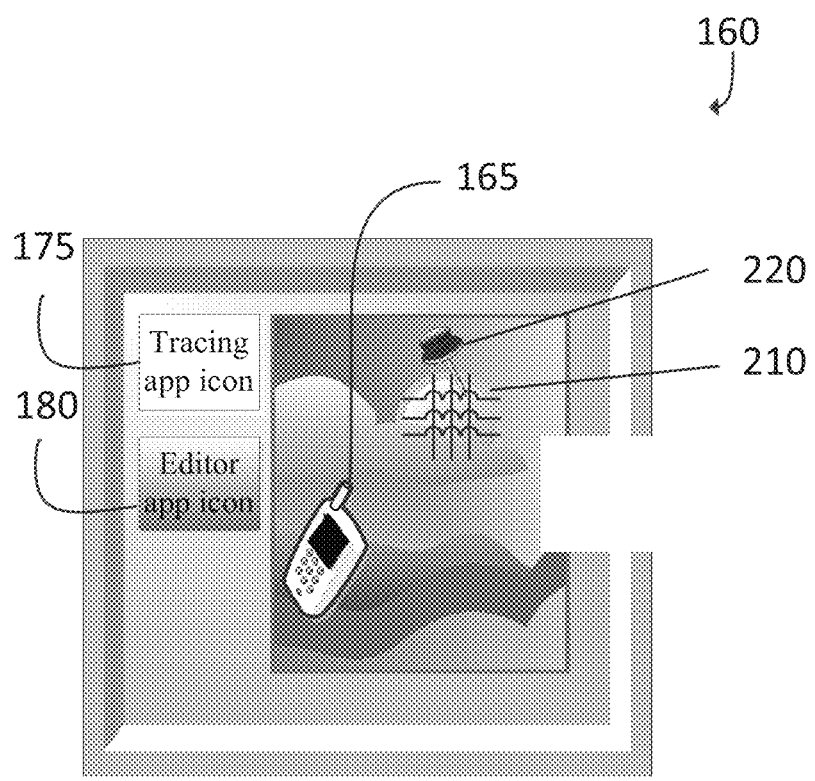
FIG. 2 illustrates the terminal screen of the system with pin control according to one embodiment of the invention.

FIG. 2 illustrates the terminal screen 160 of the system 100 with pin control 220 according to one embodiment of the invention. The editing application icon 180 is open such that the editing application 150 can make changes to the image representing the lighting. The editing application 150 includes the 3D model 165 and an image 210 having pin control 220.

The image 210 represents the lighting of the 3D model 165, creating image-based lighting. Image-based lighting allows highly detailed real-world lighting to be used to light a scene, instead of trying to accurately model illumination using an existing rendering technique. The values of the pixels in the image correspond directly to the intensity of the lighting from that location. The illustrated image 210 is of the sun, and the image 210 allows the screen of the smartphone 3D model 165 to be more realistic and lively.

The pin control 220 (e.g., pins, local control, etc.) in the editing application 150 places one or more pins that identify a specific region of the image. The pins identify where a color is to be added to the image, where a color is to be multiplied with the image, where the image is to be blurred, where a hue change is to be applied to the image, where the contrast is to be changed in the image, or where the brightness is to be changed in the image. The blur can be anisotropic to represent a specific direction of blur in the 3D lighting environment. The user applies the pin by clicking on a location of the image 210 to indicate where lighting should fall. A specific region around the pin point is where the lighting should be adjusted to achieve the illumination of the 3D model at the specified location.

A pin edits less than the entire image 210 and less than the entire 3D model 165, although the edits can be carried out throughout the entire image 210 and the 3D model 165. For example, the hue change, contract enhancement, and brightness change can be applied to the entire image 210 which changes the overall color balance of the lighting. The information about the editing procedures can be saved to a file to allow for continued editing operations.

The pin control 220 in the editing application 150 makes it easy to control and adjust the lighting. The pin control 220 makes it possible to locally adjust the intensity, color, and blur within a given region of the 3D model 165. The illustrated pin control 220 is of the sun image 210, and the pin control 220 allows the user 110 to adjust the intensity, color, and blur of the sun 210. The pins differ from traditional image based painting in that the pins 220 can be added, deleted, and copied. Each pin 220 can be moved and the region in the image 210 that is affected by the pin 220 changes correspondingly. The final image is the result of local edits performed by the one or more pins 220.

Figure 3:
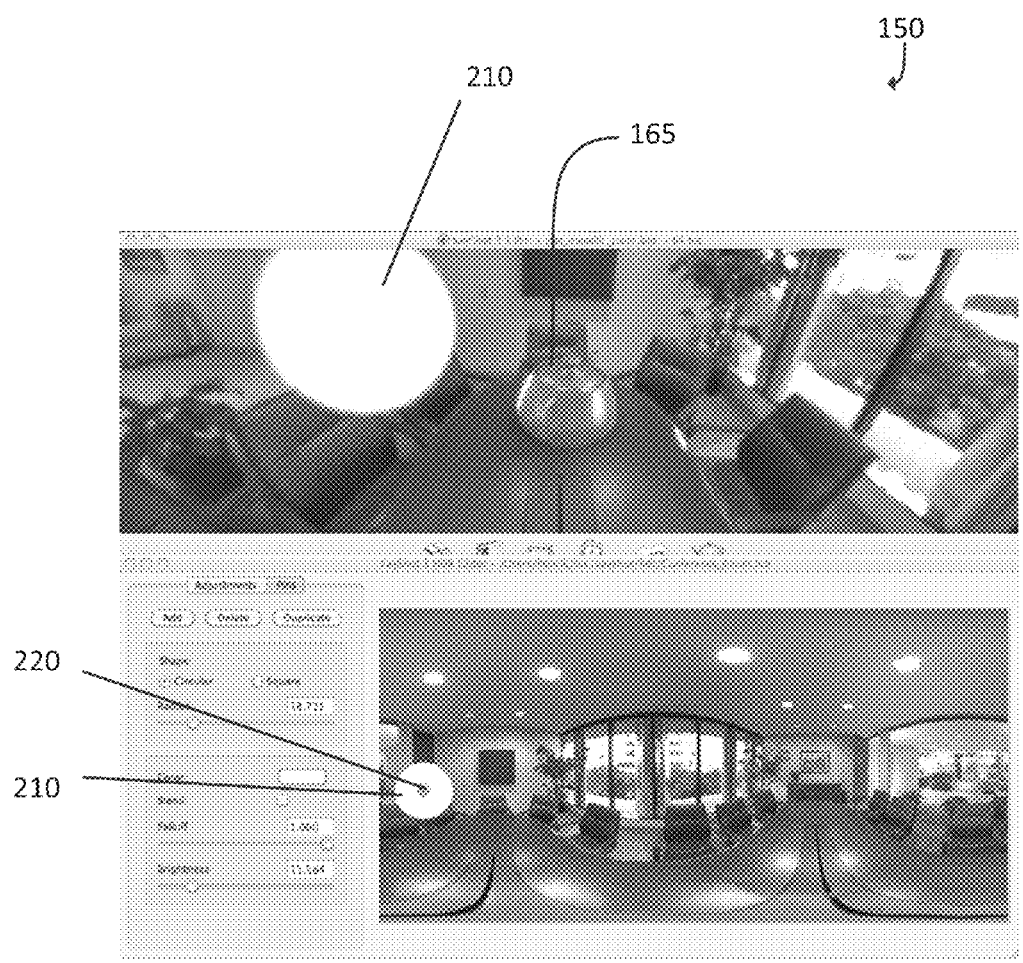
FIG. 3 illustrates a screenshot of an editing application according to one embodiment of the invention.

FIG. 3 illustrates a screenshot of the editing application 150 according to one embodiment of the invention. The editing application 150 comprises the 3D model 165 (e.g., a pot), the image 210 covering a small localized circular area, and the pin 220. The rendered image shows the 3D model 165 (a teapot) illuminated by the lighting image 210. The lighting image 210 shows the entire lighting environment. The lighting image 210 is displayed with distortion as it maps onto a sphere in the rendering application 130. The user 110 has placed a circular pin 220 in the center of the lighting image 210. This pin 220 does not appear circular in the lighting image editor, but it will be circular when mapped to the environment sphere, and it can be seen as spherical in the rendered image 210. The teapot 165 shows the reflection and lighting that result from both the lighting image and the newly added pin.

A key feature of the image-based lighting editor 150 is the tight connection with the rendering application 130. There are conventional tools that allow image-based lighting to be created and pushed to (not from) a rendering application, but the system 100 allows the image-based lighting 210 representation to flow both ways. This both way flow, combined with the pins 220, forms a novel rendering and editing system 100.

FIG. 3 also illustrates the two methods that can be used to place the pins 220. A first method is to place the pin 220 by clicking in the editor 150. This pin 220 can be moved and the corresponding lighting changes on the 3D model 165 can be seen. In addition a shape, brightness, color, and blend mode can be selected for this pin 220. A second method is to point directly onto the 3D model 165 and indicate where the lighting should fall on the 3D model 165. This lighting can be due to a reflection of the lighting image in the 3D model 165 or it can be due to diffuse illumination of the 3D model 165. The pin 220 results in a bright reflection on the left side of the teapot. By clicking on this part of the teapot 165 the pin location can be computed and transferred to the editing application 150. Furthermore, the user 110 can click on multiple locations on the 3D model 165 to indicate the desired shape and location of the illumination falling on the model 165. The effect of clicking on the 3D model 165 will be pins placed in the editing application 150 indicating the position of the lighting necessary to give the requested illumination of the 3D model.

Figure 4:
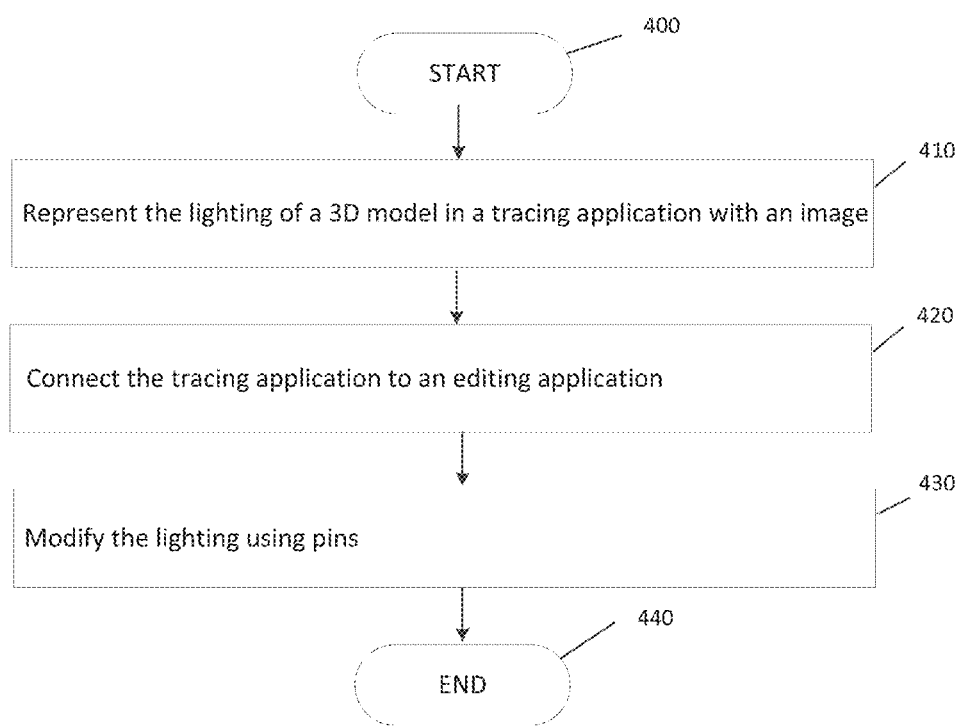
FIG. 4 illustrates a flow chart showing a process for live editing and integrated control of image-based lighting of a 3D model according to one embodiment of the invention.

FIG. 4 illustrates a flow chart showing a process for live editing and local control of a 3D model having image-based lighting according to one embodiment of the invention. The process starts at step 400. At step 410, the system 100 represents the lighting of the 3D model 165 in the raytracing application 130 with the image 210. The values of the pixels in the image 210 correspond directly to the intensity of the lighting from that location. Next, at step 420, the connection 140 connects the raytracing application 130 to the editing application 150. The connection 140 integrates these two applications 130, 150 and allows for live editing of the image 210. At step 430, the system 100 then modifies the lighting using the pins 220. The pins 220 are placed either directly in the lighting image 210 or by identifying regions of desired illumination on the 3D model 165. The pins 220 change the lighting, not the 3D model 165. Pin control 220 allows local control of the lighting, such as pins 220 for locally adjusting the intensity, color, and blur. The process ends at step 440.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

It should be understood that the invention is not limited to the embodiments set forth herein for purposes of exemplification, but is to be defined only by a fair reading of the appended claims, including the full range of equivalency to which each element thereof is entitled. Although the invention has been described with reference to the above examples, it will be understood that modifications and variations are encompassed within the spirit and scope of the invention. Accordingly, the invention is limited only by the following claims.

What is claimed is:

1. A system comprising:
a raytracing application configured to display a three-dimensional model using a processor, the three-dimensional model illuminated by an image having image-based lighting;
an editing application configured to edit the image using the processor, wherein the editing application comprises pin control, wherein the pin control comprises one or more pins configured to adjust less than the entire image, wherein the pin identifies a region of the image that can be copied and moved to another location in the image; and
a connection configured to connect the raytracing application to the editing application, wherein the connection is configured to transfer information from the raytracing application to the editing application using the processor.

2. The system of claim 1, wherein the editing application places the one or more pins, wherein the pins identify a region of the image where a color is added, multiplied, or blurred.

3. The system of claim 2, wherein the blur is anisotropic to represent a specific direction of the blur.

4. The system of claim 1, wherein the editing application places the one or more pins that identify a region where a hue, a contrast, or a brightness is changed in the image.

5. The system of claim 1, wherein the one or more pins are moved around in the image after being placed.

6. The system of claim 1, wherein the one or more pins are toggled on and off to evaluate the lighting of the 3D model.

7. The system of claim 1, wherein a hue change, a contrast enhancement, or a brightness change is applied to the entire image.

8. The system of claim 1, wherein the image is deformed to simulate a rotation of the lighting.

9. The system of claim 1, wherein the ray tracing application saves a file that contains information about both the state of the ray tracing application as well as the editing application.

10. The system of claim 1, wherein location of the one or more pins is computed in the ray tracing application based on a specified location on the 3d model and the pin locations are then transferred to the editing application.

11. A system comprising:
a raytracing application configured to display a three-dimensional model using a processor, the three-dimensional model illuminated by an image having image-based lighting;
an editing application configured to edit the image, wherein the editing application comprises pin control, wherein the pin control comprises one or more pins configured to adjust less than the entire image, wherein location of the one or more pins is computed in the ray tracing application based on a specified location on the 3d model and the pin locations are then transferred to the editing application; and a connection configured to connect the raytracing application to the editing application, wherein the connection is configured to transfer information from the raytracing application to the editing application using the processor.

12. The system of claim 11, wherein the editing application places the one or more pins, wherein the pins identify a region of the image where a color is added, multiplied, or blurred.

13. The system of claim 12, wherein the blur is anisotropic to represent a specific direction of the blur.

14. The system of claim 11, wherein the editing application places the one or more pins that identify a region where a hue, a contrast, or a brightness is changed in the image.

15. The system of claim 11, wherein the pin identifies a region of the image that can be copied and moved to another location in the image.

16. The system of claim 11, wherein the one or more pins are moved around in the image after being placed.

17. The system of claim 11, wherein the one or more pins are toggled on and off to evaluate the lighting of the 3D model.

18. A system comprising:
a raytracing application configured to display a three-dimensional model using a processor, the three-dimensional model illuminated by an image having image-based lighting;

an editing application configured to edit the image, wherein the editing application comprises pin control, wherein the pin control comprises one or more pins configured to adjust less than the entire image, wherein the editing application places the one or more pins, wherein the pins identify a region of the image where a color is added, multiplied, or blurred, wherein the blur is anisotropic to represent a specific direction of the blur; and a connection configured to connect the raytracing application to the editing application, wherein the connection is configured to transfer information from the raytracing application to the editing application using the processor.

19. The system of claim 18, wherein the editing application places the one or more pins that identify a region where a hue, a contrast, or a brightness is changed in the image.

20. The system of claim 18, wherein the pin identifies a region of the image that can be copied and moved to another location in the image.

* * * * *